(12) United States Patent
Choi et al.

(10) Patent No.: US 10,509,406 B2
(45) Date of Patent: Dec. 17, 2019

(54) APPARATUS FOR CONTROLLING COMPETITION OF AUTONOMOUS VEHICLE, SYSTEM HAVING THE SAME AND METHOD THEREOF

(71) Applicant: Hyundai Motor Company, Seoul (KR)

(72) Inventors: Tae Sung Choi, Hwaseong-si (KR); Dong Hwi Lee, Suwon-si (KR); Su Jung Yoo, Incheon (KR)

(73) Assignee: Hyundai Motor Company, Seoul (KR)

( * ) Notice: Subject to any disclaimer, the term of this patent is extended or adjusted under 35 U.S.C. 154(b) by 218 days.

(21) Appl. No.: 15/591,377

(22) Filed: May 10, 2017

(65) Prior Publication Data

US 2018/0239358 A1    Aug. 23, 2018

(30) Foreign Application Priority Data

Feb. 17, 2017   (KR) .................... 10-2017-0021473

(51) Int. Cl.
| | | |
|---|---|---|
| *B60W 30/09* | (2012.01) | |
| *B60W 30/095* | (2012.01) | |
| *B60W 30/10* | (2006.01) | |
| *G05D 1/02* | (2006.01) | |
| *G05D 1/00* | (2006.01) | |

(52) U.S. Cl.
CPC .......... *G05D 1/0214* (2013.01); *B60W 30/09* (2013.01); *B60W 30/095* (2013.01); *B60W 30/10* (2013.01); *G05D 1/0088* (2013.01); *G05D 1/0246* (2013.01); *B60W 2420/42* (2013.01); *B60W 2550/22* (2013.01); *B60W 2550/308* (2013.01)

(58) Field of Classification Search
CPC .............. B60W 30/09; B60W 30/095; B60W 30/0956; G05D 1/021; G05D 1/0212; G05D 1/0214
See application file for complete search history.

(56) References Cited

U.S. PATENT DOCUMENTS

| | | | |
|---|---|---|---|
| 8,849,494 | B1 | 9/2014 | Herbach et al. |
| 10,173,675 | B2 * | 1/2019 | Lopez ................... B60W 40/04 |
| 2007/0035416 | A1 | 2/2007 | Tanaka et al. |
| 2013/0018572 | A1 | 1/2013 | Jang |

(Continued)

FOREIGN PATENT DOCUMENTS

| | | |
|---|---|---|
| KR | 10-2013-0007754 A | 1/2013 |
| KR | 10-2016-0056711 A | 5/2016 |

*Primary Examiner* — Anshul Sood
(74) *Attorney, Agent, or Firm* — Morgan, Lewis & Bockius LLP

(57) ABSTRACT

An apparatus for controlling competition of an autonomous vehicle may include an autonomous drive determination device that determines whether the autonomous vehicle is capable of entering a competitive space in a situation where the autonomous vehicle is required to move into the competitive space during autonomous driving, a vehicle control device that controls the autonomous vehicle such that the autonomous vehicle enters the competitive space when the autonomous vehicle is capable of entering the competitive space, and when the autonomous vehicle fails to enter the competitive space after attempting to enter the competitive space, a vehicle competition control device that controls such that the attempt to enter the competitive space is held for a first competition waiting time.

18 Claims, 10 Drawing Sheets

(56) References Cited

U.S. PATENT DOCUMENTS

2014/0278029 A1\* 9/2014 Tonguz .................. G08G 1/161
                                                        701/117
2016/0129907 A1   5/2016 Kim et al.
2016/0161271 A1   6/2016 Okumura
2017/0305335 A1\* 10/2017 Wei ......................... B60Q 1/46
2018/0326982 A1\* 11/2018 Paris ................ B60W 30/0956

\* cited by examiner

APPARATUS FOR CONTROLLING COMPETITION OF AUTONOMOUS VEHICLE, SYSTEM HAVING THE SAME AND METHOD THEREOF

CROSS-REFERENCE(S) TO RELATED APPLICATIONS

The present application claims priority to Korean Patent Application No. 10-2017-0021473, filed on Feb. 17, 2017, the entire contents of which is incorporated herein for all purposes by this reference.

BACKGROUND OF THE INVENTION

Field of the Invention

The present invention relates to an apparatus for controlling competition of an autonomous vehicle, a system including the same and a method thereof, and more particularly, to a technique capable of recognizing and solving a competitive situation of an autonomous vehicle.

Description of Related Art

In a situation where a plurality of autonomous vehicles are traveling on a road, when there is no competitive strategy between autonomous vehicles with the same or similar strategies as the autonomous vehicles try to enter the same space at the same time, it is possible to cause an inefficient situation in which an entry failure is repeated.

As described above, in a situation where competition between autonomous vehicles is required, since there is not an arbitrator to control the situation a need to provide a technology capable of controlling such a competition situation based on a determination reference of each vehicle is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various embodiments of the present invention are directed to provide an apparatus for controlling competition of an autonomous vehicle capable of recognizing a competition situation of autonomous vehicles and allowing each autonomous vehicle to safely pass through a competitive space in consideration of an order of priority and the number of entries, a system including the same and a method thereof.

The technical problems to be solved by the present inventive concept are not limited to the aforementioned problems, and any other technical problems not mentioned herein will be clearly understood from the following description by those skilled in the art to which the present invention pertains.

According to various aspects of the present invention, an apparatus for controlling competition of an autonomous vehicle includes an autonomous drive determination device configured to determine whether the autonomous vehicle is capable of entering a competitive space in a situation where the autonomous vehicle is required to move into the competitive space during autonomous driving; a vehicle control device configured to control the autonomous vehicle wherein the autonomous vehicle enters the competitive space when the autonomous vehicle is capable of entering the competitive space, and when the autonomous vehicle fails to enter the competitive space after attempting to enter the competitive space; and a vehicle competition control device configured to control the attempt to enter the competitive space wherein the attempt is held for a first competition waiting time.

The vehicle competition control device may include an entry success determination device configured to determine whether the autonomous vehicle successfully enters the competitive space, and a waiting time calculation device configured to determine the first competition waiting time based on an order of priority or a number of entries into the competitive space when the autonomous vehicle fails to enter the competitive space.

The waiting time calculation device may determine the first competition waiting time based on the order of priority or the number of entries into the competitive space when the autonomous vehicle first fails to enter the competitive space, and may determine a second competition waiting time based on the order of priority or the number of entries into the competitive space when the autonomous vehicle fails to enter the competitive space at least twice.

The waiting time calculation device may increase the first competition waiting time or the second competition waiting time as the priority is lowered or the number of entries into the competitive space is increased.

In a case where a competing vehicle, which intends to enter the competitive space, is closer to a center line, a speed of the competing vehicle is lower, the competing vehicle is a straight-ahead vehicle at an intersection, the competing vehicle is a vehicle entering through an entry lane, a total number of lanes of a traveling road is larger, or the competing vehicle is a vehicle which is able to deviate from a path due to failure of entry into the competitive space, the waiting time calculation device may increase the order of priority.

The waiting time calculation device may give a high priority to a vehicle that tries to change to an outermost lane for turning right on a path or a vehicle that tries to change to a first lane or a left pocket lane for turning left on the path.

The vehicle control device may control the autonomous vehicle wherein the autonomous vehicle re-enters the competitive space after waiting for the first competition waiting time or a second competition waiting time.

When the competition space entry fails, the vehicle control device may control the autonomous vehicle wherein the autonomous vehicle holds the entry into the competitive space and return to a previous traveling region or stops.

The situation where the autonomous vehicle is required to move into the competitive space may include one or more of a non-traffic-light intersection situation, an entry or exit lane existence situation, a lane dividing or merging situation, a situation in which vehicles change to a same lane, and a rotary intersection entry or exit situation.

The autonomous drive determination device may include an autonomous path generation device configured to generate an autonomous traveling path for autonomous traveling to a destination, an autonomous trajectory generation device configured to generate a movement route when entering the competitive space in the autonomous traveling path, and an autonomous strategy generation device configured to determine whether it is possible to enter the competitive space.

The autonomous strategy generation device may determine whether it is possible for the autonomous vehicle to collide with a competitor vehicle when the autonomous vehicle enters the competitive space.

The vehicle control device may control the autonomous vehicle wherein the autonomous vehicle travels along the autonomous traveling path, and the autonomous vehicle travels along the trajectory when the autonomous strategy generation device determines that it is possible to enter the competitive space.

Various aspects of the present invention are directed to providing a system for controlling competition of an autonomous vehicle and includes an apparatus for recognizing a surrounding situation which photographs and detects the surrounding situation, and an apparatus for controlling competition of the autonomous vehicle which determines whether the autonomous vehicle is capable of entering a competitive space in a situation where the autonomous vehicle is required to move into the competitive space during autonomous driving, controls the autonomous vehicle wherein the autonomous vehicle enters the competitive space when the autonomous vehicle is capable of entering the competitive space, and when the autonomous vehicle fails to enter the competitive space after attempting to enter the competitive space, controls the vehicle wherein the attempt to enter the competitive space is held for a first competition waiting time.

The apparatus for recognizing the surrounding situation may include a camera configured to photograph the surrounding situation, and a sensor device configured to detect a surrounding vehicle.

Various aspects of the present invention are directed to providing a method for controlling competition of an autonomous vehicle which includes determining whether the autonomous vehicle is capable of entering a competitive space in a situation where the autonomous vehicle is required to move into the competitive space during autonomous driving, when the autonomous vehicle fails to enter the competitive space after attempting to enter the competitive space controlling the autonomous vehicle wherein the autonomous vehicle holds the entry into the competitive space and returns to a previous traveling direction or stops, determining a competition waiting time based on an order of priority or a number of entries into the competitive space, and attempting to re-enter the competitive space after waiting for the competition waiting time to elapse.

The method may further include determining a second competition waiting time based on the order of priority or the number of entries when the number of times of failure to enter the competitive space is at least twice or more.

Determination of the second competition waiting time may include increasing the second competition waiting time as the order of priority is lowered or the number of entries increases.

The method may further include controlling the autonomous vehicle wherein the autonomous vehicle attempts to re-enter the competitive space after waiting for the second competition waiting time to elapse.

The situation where the autonomous vehicle is required to move into the competitive space may include one or more of a non-traffic-light intersection situation, an entry or exit lane existence situation, a lane dividing or merging situation, a situation in which vehicles change to a same lane, and a rotary intersection entry or exit situation.

Determining the second competition waiting time may include increasing the order of priority in the cases where a competing vehicle which intends to enter the competitive space, is closer to a center line, the speed of the competing vehicle is lower, the competing vehicle is a straight-ahead vehicle at an intersection, the competing vehicle is a vehicle entering through an entry lane, a total number of lanes of a traveling road is larger, or the competing vehicle is a vehicle which is able to deviate from a path due to failure of entry into the competitive space.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
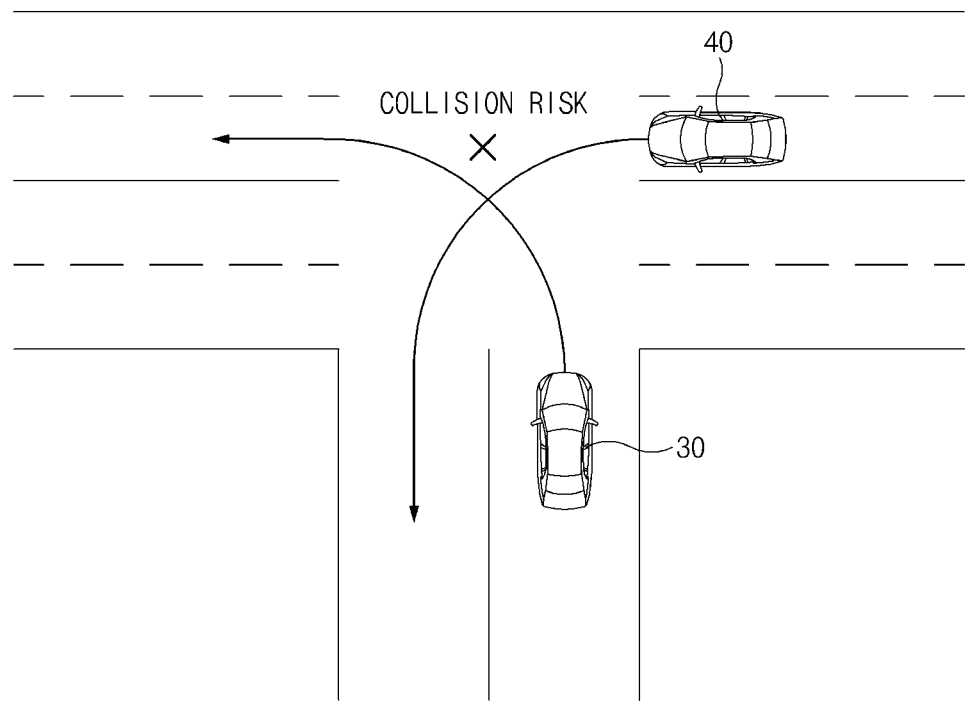
FIG. 1 is a view illustrating an example of a competition situation of an autonomous vehicle in an intersection according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In describing the components of the present invention, terms like first, second, A, B, (a), and (b) may be used. These terms are intended solely to distinguish one component from another, and the terms do not limit the nature, sequence or order of the constituent components. In addition, unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIG. 1 to FIG. 6.

When a plurality of autonomous vehicles are driven on a road, the present technique allows the autonomous vehicles to determine the risk of a collision between the autonomous vehicles in a competitive situation that may occur between the autonomous vehicles, and to drive after avoiding the competition situation in consideration of an order of priority and the number of entries. The competition situation that may occur between a plurality of autonomous vehicles device that the autonomous vehicles are to enter the same space at the same time.

Figure 2:
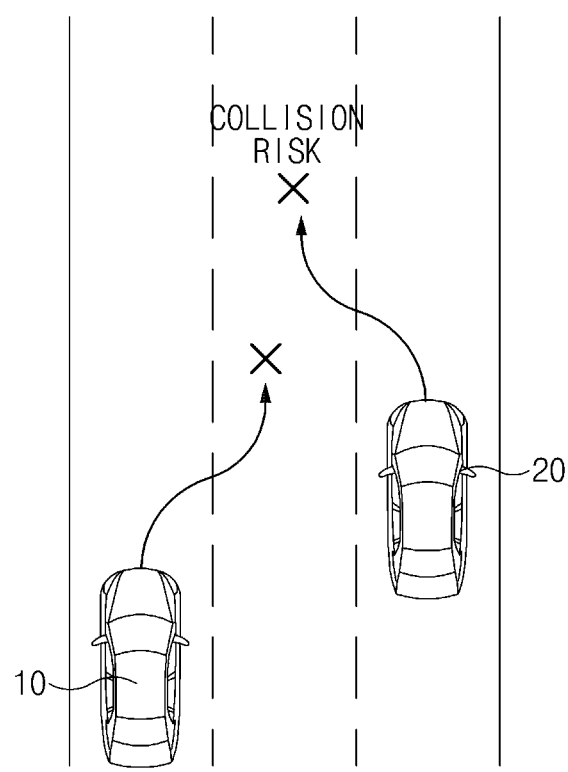
FIG. 2 is a view illustrating an example of a competition situation of an autonomous vehicle during a lane change according to an exemplary embodiment of the present invention.

For example, the competition situation may include a non-traffic-light intersection situation of FIG. 1, an entry and or exit lane existence situation, a lane dividing or merging situation, a situation in which vehicles change their lanes to the same lane as shown in FIG. 2, and a rotary intersection entry and or exit situation. FIG. 1 is a view illustrating an example of a competition situation of an autonomous vehicle in an intersection according to an exemplary embodiment of the present invention. FIG. 2 is a view illustrating an example of a competition situation of an autonomous vehicle during a lane change according to an exemplary embodiment of the present invention.

Figure 3:
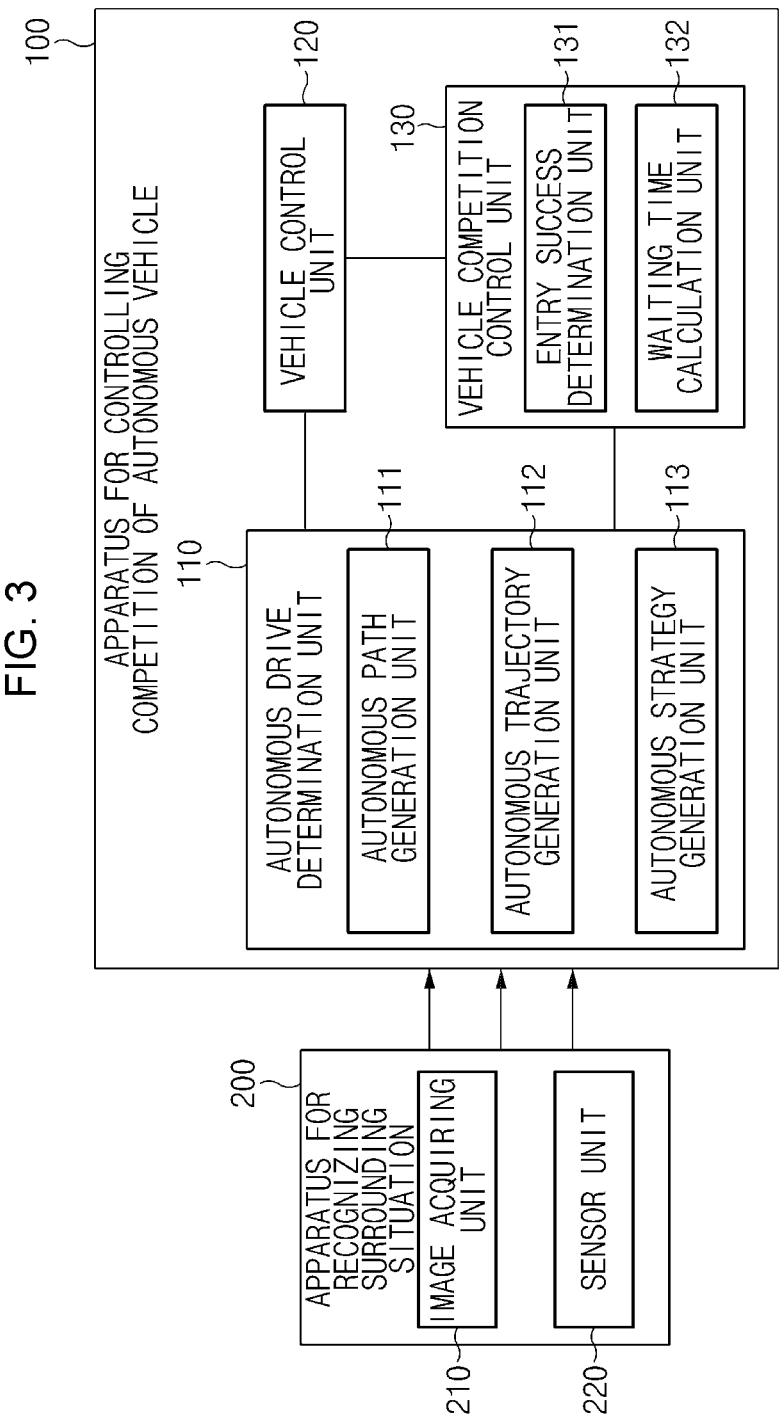
FIG. 3 is a view illustrating a configuration of a system for controlling competition of an autonomous vehicle according to an exemplary embodiment of the present invention.

FIG. 3 is a view illustrating a configuration of a system for controlling competition of an autonomous vehicle according to an exemplary embodiment of the present invention.

Referring to FIG. 3, a system for controlling competition of an autonomous vehicle according to an exemplary embodiment of the present invention includes an apparatus 100 configured for controlling competition of an autonomous vehicle, and an apparatus 200 configured for recognizing a surrounding situation.

The apparatus 100 for controlling competition of an autonomous vehicle determines whether the autonomous vehicle is capable of entering a competitive space in a situation where the autonomous vehicle is required to move into a competitive space during autonomous driving. The apparatus 100 for controlling competition of an autonomous vehicle controls the autonomous vehicle wherein the autonomous vehicle enters the competitive space when the autonomous vehicle is capable of entering the competitive space. When the autonomous vehicle fails to enter the competitive space after attempting to enter the competitive space, the apparatus 100 for controlling competition of an autonomous vehicle controls the attempt to enter the competitive space wherein the attempt is held for a competition waiting time.

To the present end, the apparatus 100 for controlling competition of an autonomous vehicle may include an autonomous drive determination device 110, a vehicle control device 120, and a vehicle competition control device 130.

The autonomous drive determination device 110 may determine whether the autonomous vehicle is capable of entering the competitive space in the situation where the autonomous vehicle is required to move into the competitive space during autonomous driving.

The autonomous drive determination device 110 includes an autonomous path generation device 111, an autonomous trajectory generation device 112, and an autonomous strategy generation device 113.

The autonomous path generation device 111 is configured to generate an autonomous traveling path for autonomous traveling to a destination.

The autonomous trajectory generation device 112 is configured to generate a movement trajectory when entering the competitive space in the autonomous traveling path.

The autonomous strategy generation device 113 is configured to determine whether it is possible to enter the competitive space, and determines a target lane and a traveling speed.

That is, the autonomous strategy generation device 113 may determine whether it is possible for the autonomous vehicle to collide with a competitor vehicle when the autonomous vehicle enters the competitive space. The autonomous strategy generation device 113 may continuously determine the possibility of collision while entering the competitive space to determine whether the autonomous vehicle is able to enter the competitive space. The autonomous strategy generation device 113 may determine whether it is possible for the autonomous vehicle to collide with the competitor vehicle based on the movement trajectory of the autonomous vehicle and the movement trajectory of the competitor vehicle when the movement trajectory of the autonomous vehicle and the movement trajectory of the recognized competitor vehicle are predicted. In the present case, the competitor vehicle means a vehicle that intends to enter the competitive space simultaneously with the autonomous vehicle.

The vehicle control device 120 is configured to control the autonomous vehicle based on commands from the vehicle competition control device 130 and the autonomous drive determination device 110. That is, the vehicle control device 120 controls the autonomous vehicle wherein the autonomous vehicle enters the competitive space when it is possible for the autonomous vehicle to enter the competitive space. In addition, the vehicle control device 120 may control the autonomous vehicle wherein the autonomous vehicle attempts to re-enter the competitive space after waiting for a first or second competition waiting time.

In addition, when the competition space entry fails, the vehicle control device 120 may control the autonomous vehicle wherein the autonomous vehicle holds the entry into the competitive space and returns to a previous traveling region or stops.

In addition, the vehicle control device 120 may control the autonomous vehicle wherein the autonomous vehicle travels along the trajectory when the autonomous travels along an autonomous traveling path and the autonomous strategy generation device 113 determines that it is possible to enter the competitive space.

When the autonomous vehicle fails to enter the competitive space after attempting to enter the competitive space, the vehicle competition control device 130 controls the attempt to enter the competitive space wherein the attempt is held for the first competition waiting time. To the present end, the vehicle competition control device 130 includes an entry success determination device 131 and a waiting time calculation device 132.

The entry success determination device 131 is configured to determine whether the autonomous vehicle successfully enters the competitive space.

The waiting time calculation device 132 is configured to determine the first competition waiting time based on an order of priority or the number of entries into the competitive space when the autonomous vehicle fails to enter the competitive space. In addition, the waiting time calculation device 132 determines the first competition waiting time based on the order of priority or the number of entries into the competitive space when the autonomous vehicle first fails to enter the competitive space, and determines the second competition waiting time based on the order of priority or the number of entries into the competitive space when the autonomous vehicle fails to enter the competitive space at least twice.

That is, the waiting time may be determined as following Equation 1.

$$T_{step,i} = T_{unit} \cdot 2^{X_{n,i}}$$ Equation 1

Where $T_{step,i}$ is the waiting time, $T_{unit}$ is a unit maintaining time, and $X_{n,i}$ is a random variable. In the present case, 'n' is an order of priority, and 'i' is the number of entries into the same competitive space Thus, $X_{n,i}$ is determined based on the order of priority and the number of entries into the same competitive space. As described above, the waiting time is determined by the random variable which may be defined as following Equation 2.

$$X_{n,i} \sim U(X_n, X_n + \alpha_i)$$ Equation 2

Where 'α' is a range of values of the random variable. As the number of entries increases, 'α' increases.

When vehicles on the same link and road compete against each other, the waiting time calculation device 132 gives a higher priority to a vehicle closer to the center line of the road and gives a higher priority to the vehicle speed with a lower.

In addition, when the vehicles located on different links and roads compete against each other (for example, an intersection, an entry lane, etc.), the waiting time calculation device 132 may give a higher priority to a vehicle as the total number of lanes on the road on which the vehicle travels is larger, and may utilize the type of a road itself. In addition, in the case of an intersection, the waiting time calculation device 132 may give a higher priority to a straight-ahead vehicle than a left or right-turning vehicle, and may give a high priority to a vehicle which enters a main road through an entry lane.

In the case where a vehicle fails to enter the competitive space so that the vehicle leaves the route, the waiting time calculation device 132 may give a high priority to a vehicle that tries to change to the outermost lane for turning right on the path, or a vehicle that tries to change to the first lane or the left pocket lane for turning left on the path.

In addition, the waiting time calculation device 132 increases the waiting time as the number of entries into the competitive space increases and the priority is higher.

The apparatus 200 for recognizing a surrounding situation photographs and detects a surrounding situation and includes an image acquiring device 210 and a sensor device 220.

The image acquiring device 210 includes a camera for photographing surroundings.

The sensor device 220 may include radar and a laser scanner to detect a surrounding vehicle.

Figure 4A:
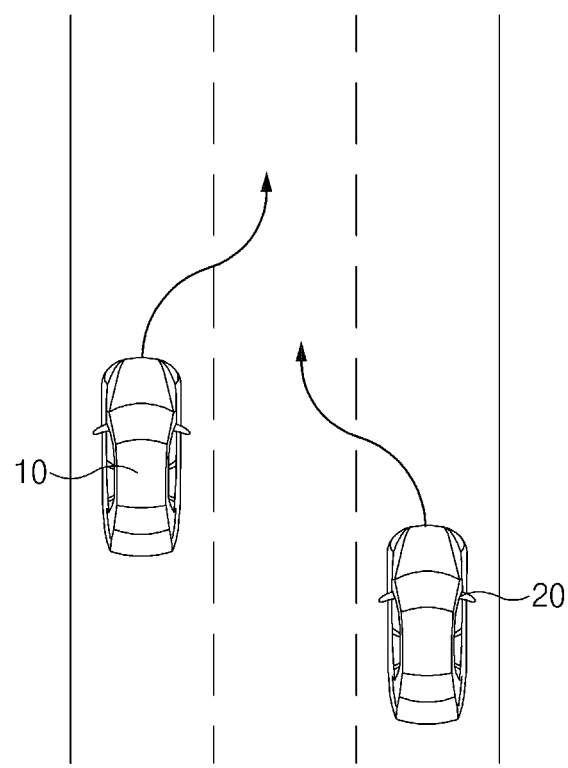
FIG. 4A is a view illustrating a competition state of an autonomous vehicle according to an exemplary embodiment of the present invention.
Figure 4B:
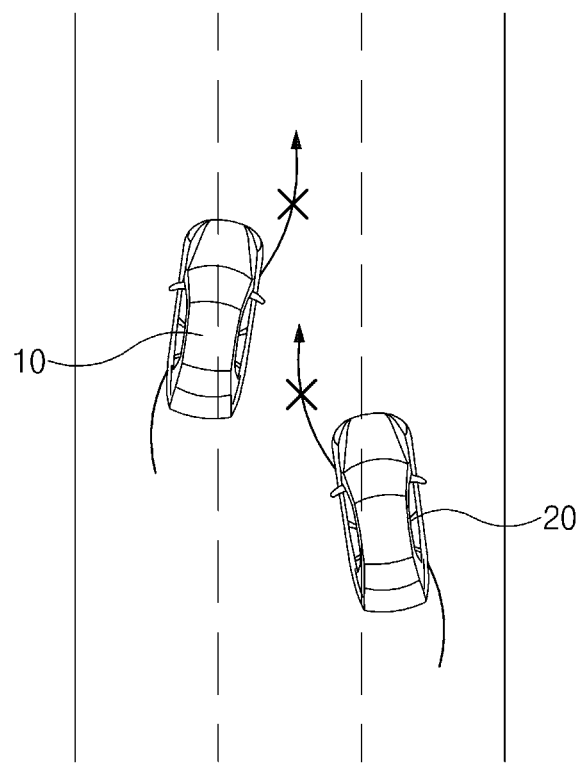
FIG. 4B is a view illustrating an example in which two autonomous vehicles simultaneously attempt to change lanes in the competitive situation of FIG. 4A.
Figure 4C:
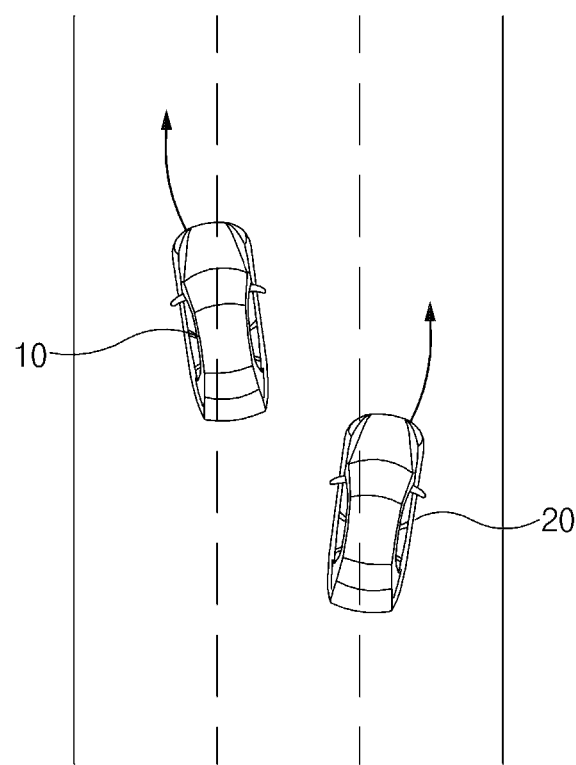
FIG. 4C is a view illustrating an example in which two autonomous vehicles attempt to change lanes at the same time in FIG. 4B to fail to change lanes, and return to their original positions.
Figure 4D:
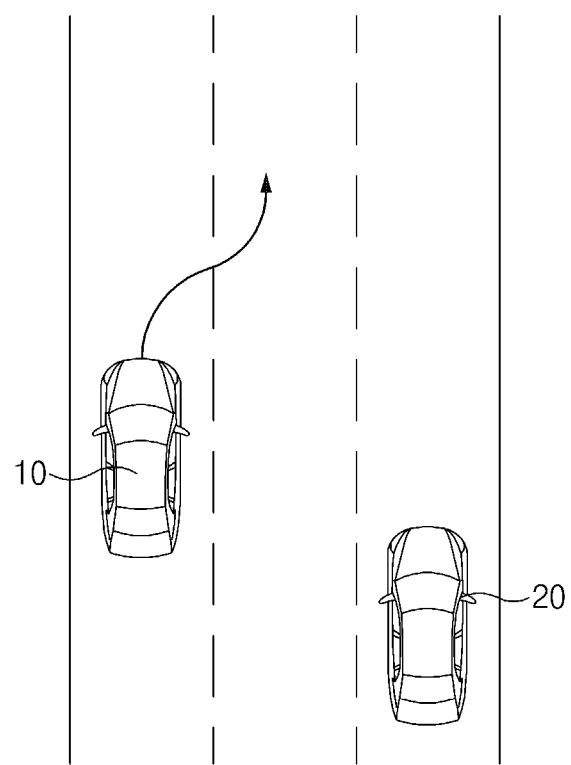
FIG. 4D is view illustrating an example in which an autonomous vehicle holds a lane change command for a predetermined waiting time in FIG. 4C.
Figure 4E:
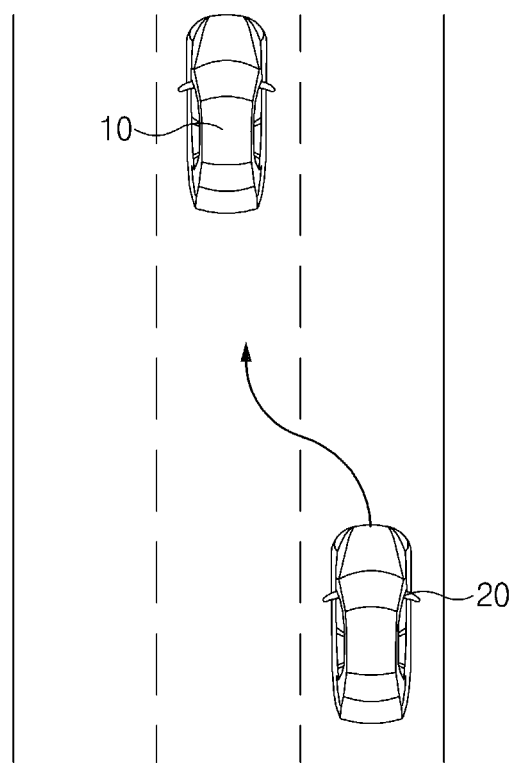
FIG. 4E is a view illustrating an example in which an autonomous vehicle attempts to change a lane after the predetermined waiting time in FIG. 4D.

FIG. 4A is a view illustrating a competition state of an autonomous vehicle according to an exemplary embodiment of the present invention. FIG. 4B is a view illustrating an example in which two autonomous vehicles simultaneously attempt to change lanes in the competitive situation of FIG. 4A. FIG. 4C is a view illustrating an example in which two autonomous vehicles attempt to change lanes at the same time in FIG. 4B to fail to change lanes, and return to their original positions. FIG. 4D is view illustrating an example in which an autonomous vehicle holds a lane change command for a predetermined waiting time in FIG. 4C. FIG. 4E is a view illustrating an example in which an autonomous vehicle attempts to change a lane after the predetermined waiting time in FIG. 4D.

Referring to FIG. 4A, when the autonomous vehicles 10 and 20 traveling on the first and third lanes attempt to simultaneously change to the second lane, the risk of collision between the vehicles 10 and 20 approaching the second lane, which is a target lane (competitive space), is detected as shown in FIG. 4B, so that the vehicles 10 and 20 all may cancel the lane changes.

Thus, as shown in FIG. 4C, the two vehicles 10 and 20 return to the originally traveling lanes.

Thereafter, the two vehicles 10 and 20 attempt to change to the second lane again. The two vehicles 10 and 20 may repeatedly attempt and fail to enter the second lane at the same time, and eventually fail to enter the second lane.

Thus, as shown in FIG. 4D, the subject vehicle 20 may wait for the waiting time wherein the other vehicle 10 first performs the lane change. As shown in FIG. 4E, after the waiting time is elapsed, the one vehicle 20 may perform the lane change, thereby preventing the collision between the autonomous vehicles.

As described above, according to an exemplary embodiment of the present invention, collision and competition situations may be avoided by controlling the vehicles approaching the same competitive space wherein the vehicles perform the lane changing attempts at different times.

Hereinafter, a method of controlling competition of an autonomous vehicle according to an exemplary embodiment of the present invention will be described in detail with reference to FIG. 5.

Figure 5:
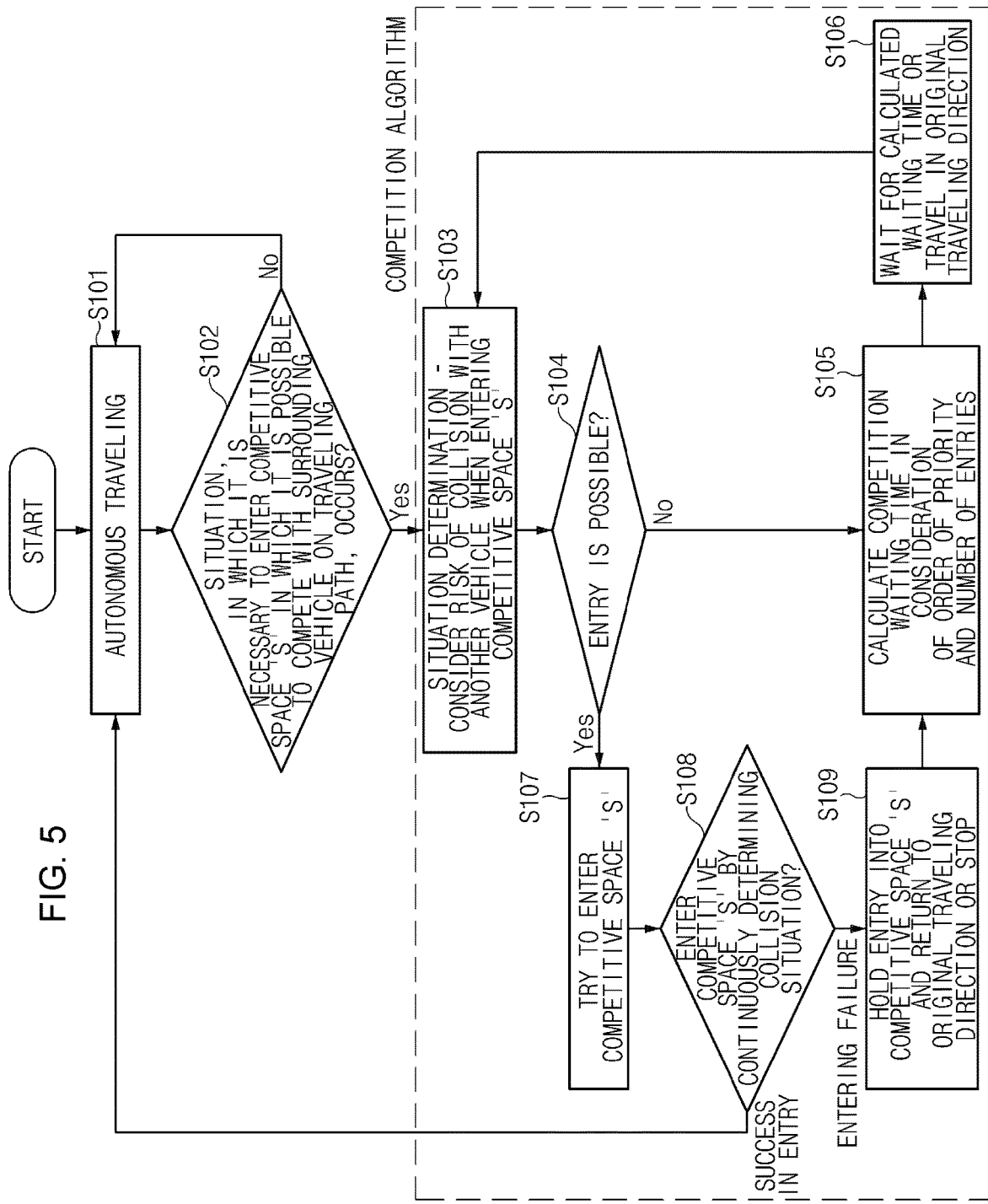
FIG. 5 is a flowchart illustrating a method of controlling competition of an autonomous vehicle according to an exemplary embodiment of the present invention.

FIG. 5 is a flowchart illustrating a method of controlling competition of an autonomous vehicle according to an exemplary embodiment of the present invention.

First, in operation S102, the apparatus 100 for controlling competition of an autonomous vehicle determines whether it is necessary to move to the competitive space during the autonomous traveling (S101). When it is necessary to move to the competitive space during the autonomous traveling, the apparatus 100 for controlling competition of an autonomous vehicle determines the possibility of collision with a surrounding vehicle in operation S103, and determines whether it is possible to enter the competitive space in operation S104.

Thereafter, when it is impossible to enter the competitive space the apparatus 100 for controlling competition of an autonomous vehicle determines the competition waiting time in consideration of the order of priority and the number of entries in operation S105, and waits for the competition waiting time or travels in the original traveling direction in operation S106.

Then, when the competition waiting time is elapsed the apparatus 100 for controlling competition of an autonomous vehicle returns to operation S103 to determine whether it is possible to collide with a surrounding vehicle again.

Meanwhile, when it is possible to enter the competitive space the autonomous vehicle is controlled to try to enter the competitive space in operation S107.

Then, it is determined whether the entry into the competitive space is successful in operation S108. When successful, the vehicle continues to travel autonomously. When failed, the vehicle holds the entry into the competitive space and returns to its original traveling direction or stops in operation S109.

The apparatus 100 for controlling competition of an autonomous vehicle determines the competition waiting time in consideration of the order of priority and the number of entries in operation S105, and waits for the competition waiting time or travels in the original traveling direction in operation S106.

Thereafter, the apparatus 100 for controlling competition of an autonomous vehicle waits for competition and then attempts to enter the competitive space again.

Thereafter, when re-entry into the competitive space has failed, the apparatus 100 for controlling competition of an autonomous vehicle re-determines the competition waiting time in consideration of the order of priority and the number of entries at that time.

Then, the apparatus 100 for controlling competition of an autonomous vehicle repeats the above operations until it successfully enters the competitive space.

As described above, according to an exemplary embodiment of the present invention, when a plurality of vehicles simultaneously attempt to approach an intersection area to pass through an intersection having no traffic lights, when it is determined as a safe situation considering the probability and possibility of collision with a vehicle approaching the intersection, the vehicle is allowed to pass through the intersection. In a situation where it is determined to be dangerous to pass through the intersection, each of the autonomous vehicles in the intersection determines its own priority to pass through the intersection.

Figure 6:
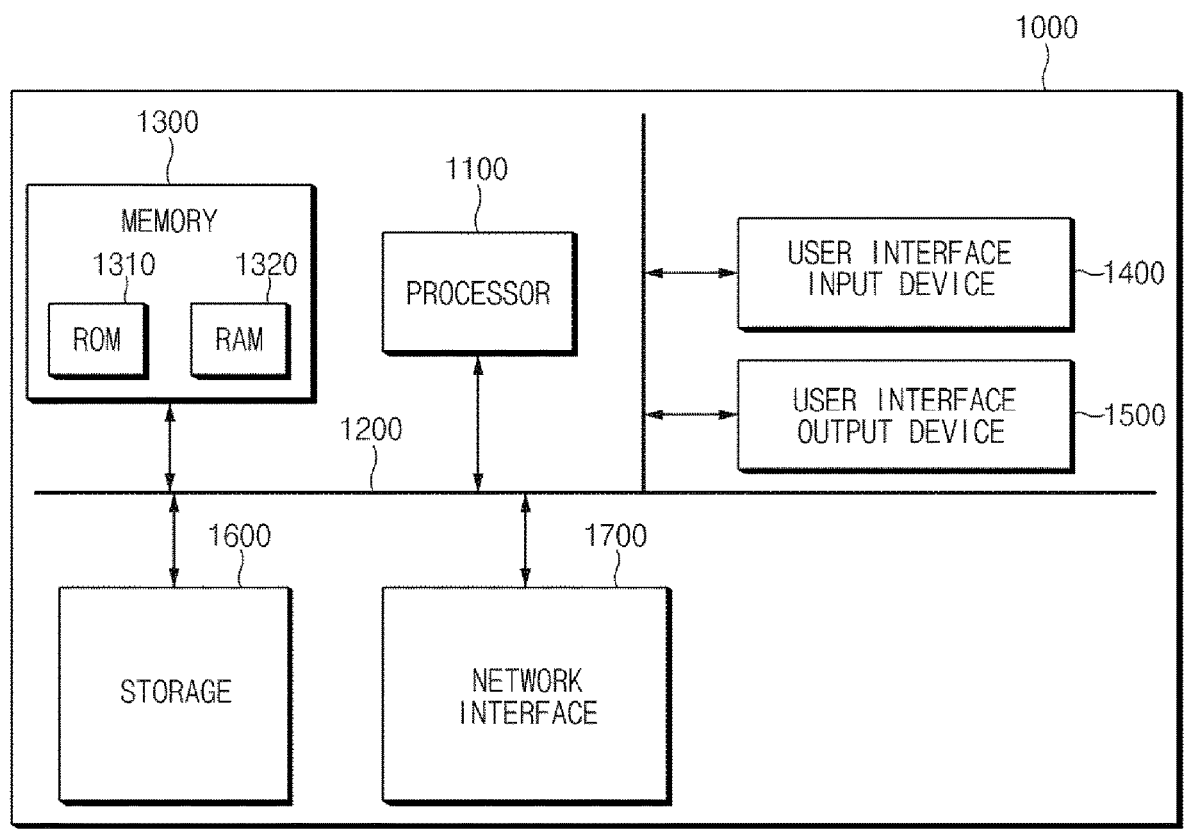
FIG. 6 is a block diagram illustrating a computer system to which a method of controlling competition of an autonomous vehicle is applied according to an exemplary embodiment of the present invention.

FIG. 6 is a block diagram illustrating a computer system to which a method of controlling competition of an autonomous vehicle is applied according to an exemplary embodiment of the present invention.

Referring to FIG. 6, a computing system 1000 may include at least one processor 1100, a memory 1300, a user interface input device 1400, a user interface output device 1500, a storage 1600, and a network interface 1700, which are connected to each other through a bus 1200.

The processor 1100 may be a central processing unit (CPU) or a semiconductor device which performs processing for instructions stored in the memory device 1300 and or the storage 1600. The memory 1300 and the storage 1600 may include various types of volatile or non-volatile storage media. For example, the memory 1300 may include a read only memory (ROM) 1310 and a random access memory (RAM) 1320.

The operations of a method or algorithm described in connection with the embodiments exemplified herein may be embodied directly in hardware, in a software module executed by the processor 1100, or in a combination of the two. The software module may reside in a storage medium (that is, the memory 1300 and or the storage 1600) such as a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), etc.

An exemplary storage medium is coupled to the processor 1100 wherein the processor 1100 may read information from, and write information to, the storage medium. Alternatively, the storage medium may be integrated into the processor 1100. The processor and the storage medium may reside in an application-specific integrated circuit (ASIC). The ASIC may reside within a user terminal. Alternatively, the processor and the storage medium may reside in the user terminal as individual components.

According to the present technique, the autonomous vehicle may recognize a competition situation and may safely pass through a competitive space in consideration of an order of priority and the number of entries.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to hereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling competition of an autonomous vehicle, the apparatus comprising:
    an autonomous drive determination device configured to determine that the autonomous vehicle is configured for entering a competitive space in a situation where the autonomous vehicle is required to move into the competitive space during autonomous driving;
    a vehicle control device configured to control the autonomous vehicle wherein the autonomous vehicle enters the competitive space when the vehicle is configured for entering the competitive space; and
    when the autonomous vehicle fails to enter the competitive space after attempting to enter the competitive space, a vehicle competition control device is configured to determine a first competition waiting time based on a random variable, and determine the random variable using a number of entries in which the autonomous vehicle fails to enter into the competitive space and control, such that the attempt to enter the competitive space is held for the first competition waiting time.

2. The apparatus of claim 1, wherein the vehicle competition control device comprises:
    an entry success determination device configured to determine that the autonomous vehicle enters the competitive space; and
    a waiting time determination device configured to determine the first competition waiting time based on an order of priority into the competitive space when the autonomous vehicle fails to enter the competitive space.

3. The apparatus of claim 2, wherein the waiting time determination device
    is configured to determine the first competition waiting time based on the order of priority or the number of entries into the competitive space when the vehicle first fails to enter the competitive space, and
    is configured to determine a second competition waiting time based on the order of priority or the number of entries into the competitive space when the autonomous vehicle fails to enter the competitive space at least twice.

4. The apparatus of claim 3, wherein the waiting time determination device increases the first competition waiting time or the second competition waiting time as the priority is lower or the number of entries into the competitive space is increased.

5. The apparatus of claim 3, wherein the waiting time determination device gives a high priority to a vehicle that tries to change to an outermost lane for turning right on a path or a vehicle that tries to change to a first lane or a left pocket lane for turning left on the path.

6. The apparatus of claim 1, wherein the vehicle control device is configured to control the autonomous vehicle wherein the autonomous vehicle re-enters the competitive space after waiting for the first competition waiting time or a second competition waiting time.

7. The apparatus of claim 1, wherein, when the competition space entry fails, the vehicle control device is configured to control the autonomous vehicle wherein the autonomous vehicle holds the entry into the competitive space and returns to a previous traveling region or stops.

8. The apparatus of claim 1, wherein the situation where the autonomous vehicle is required to move into the competitive space includes
one or more of a non-traffic-light intersection situation, an entry or exit lane existence situation, a lane dividing or merging situation, a situation in which vehicles change to a same lane, and a rotary intersection entry or exit situation.

9. The apparatus of claim 1, wherein the autonomous drive determination device includes:
an autonomous path generation device configured to generate an autonomous traveling path for autonomous traveling to a destination;
an autonomous trajectory generation device configured to generate a movement route when entering the competitive space in the autonomous traveling path; and
an autonomous strategy generation device configured to determine that it is possible to enter the competitive space.

10. The apparatus of claim 9, wherein the autonomous strategy generation device is configured to determine whether it is possible for the autonomous vehicle to collide with a competitor vehicle when the autonomous vehicle enters the competitive space.

11. The apparatus of claim 9, wherein the vehicle control device is configured to control the autonomous vehicle such that the autonomous vehicle travels along the autonomous traveling path and such that the vehicle travels along a trajectory when the autonomous strategy generation device is configured to determine that it is possible to enter the competitive space.

12. A system for controlling competition of an autonomous vehicle, the system comprising:
an apparatus for recognizing a surrounding situation configured to photograph and detect a surrounding situation; and
an apparatus for controlling competition of the autonomous vehicle configured to determine that the autonomous vehicle is configured for entering a competitive space in a situation where the autonomous vehicle is required to move into the competitive space during autonomous driving, to control the autonomous vehicle such that the autonomous vehicle enters the competitive space when the autonomous vehicle is configured for entering the competitive space, and, when the autonomous vehicle fails to enter the competitive space after attempting to enter the competitive space, to determine a first competition waiting time based on a random variable, and determine the random variable using a number of entries in which the autonomous vehicle fails to enter into the competitive space and control such that the attempt to enter the competitive space is held for the first competition waiting time.

13. The system of claim 12, wherein the apparatus for recognizing the surrounding situation includes:
a camera configured to photograph the surrounding situation; and
a sensor device configured to detect a surrounding vehicle.

14. A method for controlling competition of an autonomous vehicle, the method comprising:
determining that the autonomous vehicle is configured for entering a competitive space in a situation where the autonomous vehicle is required to move into the competitive space during autonomous driving;
when the autonomous vehicle fails to enter the competitive space after attempting to enter the competitive space, controlling the autonomous vehicle such that the autonomous vehicle holds the entry into the competitive space and returns to a previous traveling direction or stops;
determining a competition waiting time randomly based on an order of priority and a number of entries in which the autonomous vehicle fails to enter into the competitive space; and
attempting to re-enter the competitive space after waiting for the competition waiting time.

15. The method of claim 14, further including:
determining a second competition waiting time based on the order of priority or a number of entries when the number of times of failure to enter the competitive space is at least twice or more.

16. The method of claim 15, wherein the determining of the second competition waiting time includes:
increasing the second competition waiting time as the order of priority is low or the number of entries increases.

17. The method of claim 15, further including:
controlling the autonomous vehicle such that the autonomous vehicle attempts to re-enter the competitive space after waiting for the second competition waiting time.

18. The method of claim 14, wherein the situation where the autonomous vehicle is required to move into the competitive space includes one or more of a non-traffic-light intersection situation, an entry or exit lane existence situation, a lane dividing or merging situation, a situation in which vehicles change to a same lane, and a rotary intersection entry or exit situation.

* * * * *